2 Sheets—Sheet 2.
R. KITSON.
COTTON OPENER.
No. 107,922. Patented Oct. 4, 1870.
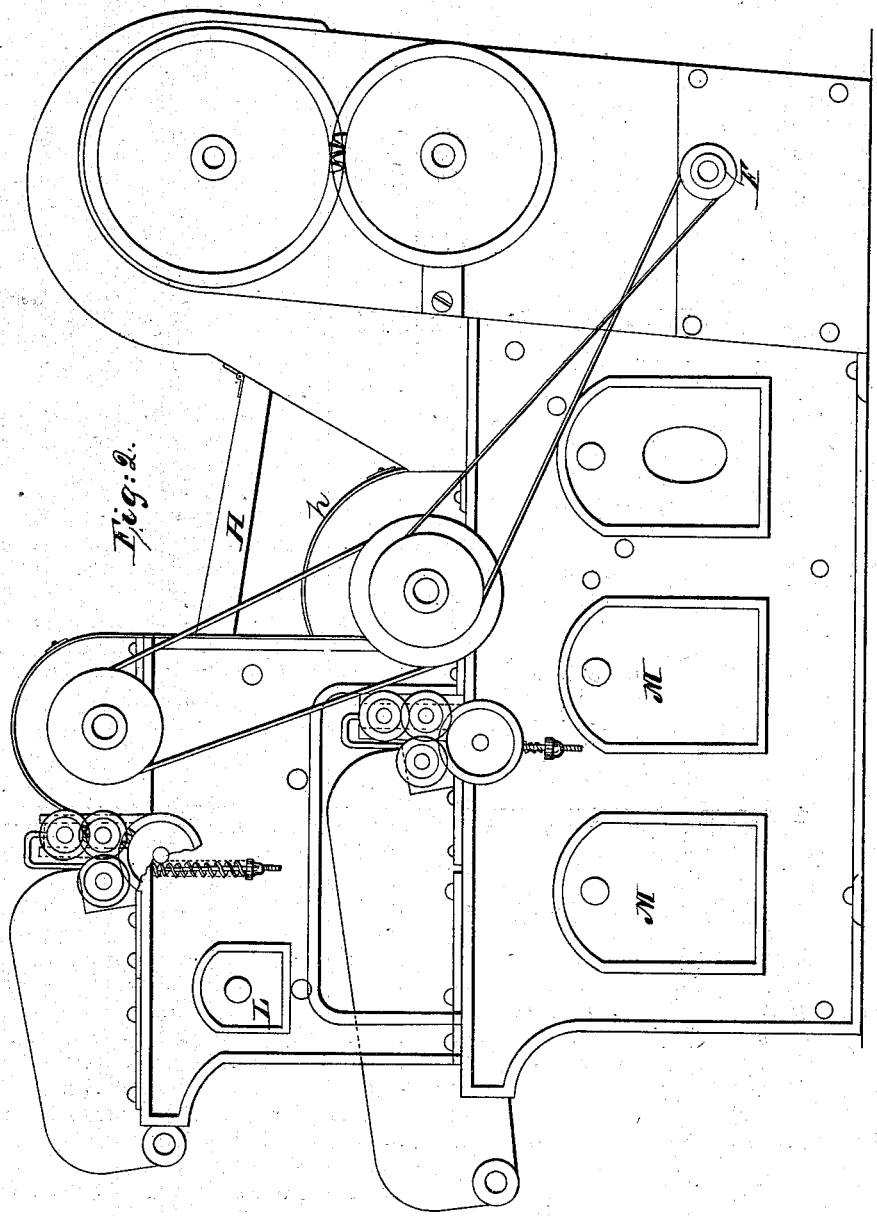

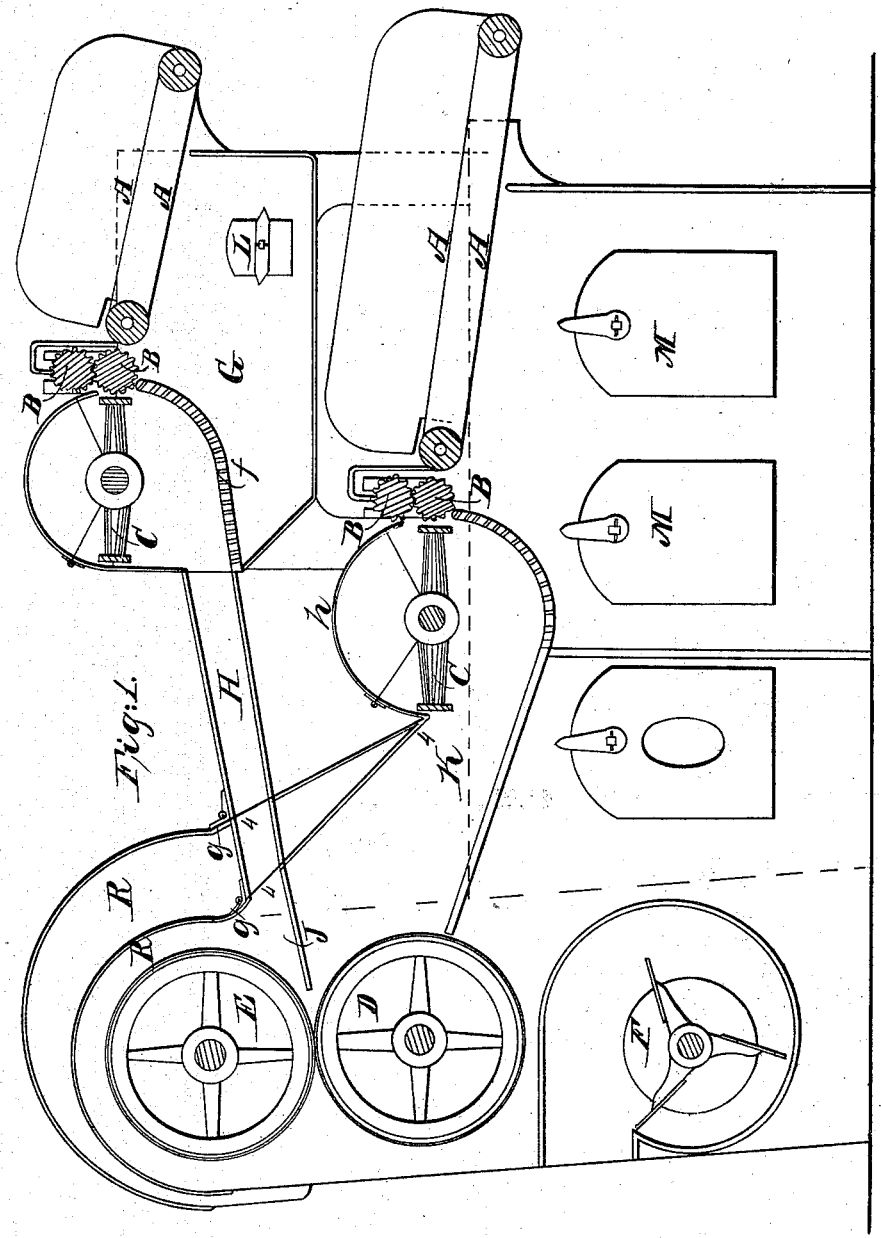

UNITED STATES PATENT OFFICE.

RICHARD KITSON, OF LOWELL, MASSACHUSETTS.

IMPROVEMENT IN COTTON-OPENERS.

Specification forming part of Letters Patent No. 107,922, dated October 4, 1870.

*To all whom it may concern:*

Be it known that I, RICHARD KITSON, of Lowell, in the county of Middlesex and State of Massachusetts, have invented certain new and useful Improvements in Cotton-Lappers, of which the following is a full, clear, and exact description, reference being had to the accompanying drawing, making part of this specification, in which—

Figure 1 on Sheet 1 represents a sectional elevation, and Fig. 2 on Sheet 2 represents an end view, of my machine.

This invention relates to certain improvements in cotton-lappers, and which are designed for use on cotton-pickers, openers, willows, and other like machines which are employed for cleaning and preparing cotton, wool, or other fibrous substances, and for forming it into a lap or continuous bat, or for doubling two or more of such laps together.

This invention has for its object to liberate and remove as great an amount of seeds, dirt, sand, and other foreign matter from cotton or other fibrous substance as possible, and at the same time to economize in room, power, cost of help and machinery, and the better performance of the cleaning, preparing, and the doubling or mixing process.

In this invention the lower portion of the machine is like or substantially similar to some of the well-known cotton-lappers now in use, and which are provided each with a feed-apron, A, feed-rolls B, a beater, C, two screen-cylinders, D and E, and a trunk or spout, K, leading from the beater to the screens, as also a fan, F, for drawing dust from the cotton and blowing it out of the room, and in some instances two beaters have been operated under one cover or bonnet, the upper beater discharging its cotton and all seeds and foreign matter directly upon the top of the lower beater, which greatly retards its action and hinders the opening and cleaning process, substantially as described in my caveat for this invention, dated December 13, and filed in the Patent Office about December 16, 1869.

My present improvements consist, primarily, in providing a seed-chamber, G, a rack, *f*, and a separate and independent delivery spout or trunk, H, for the upper beater of such a two-beater machine, such parts or elements being constructed, combined, and arranged substantially as shown in the drawing accompanying this application and those of my caveat above referred to.

The lower trunk or spout, as also the space R above the upper one, may be larger or smaller, as shown in section in Fig. 1, and in either case the upper trunk, H, should be hinged to the upper side or covering of the lower one— say at *g*—and this allows the said upper spout to be thrown up, thereby producing room or space for raising the hinged bonnet *h* of the lower beater.

The opened cotton from each beater is forced or blown through its connected trunk H and K to and against the open-work surface of the revolving screen-cylinders, and passes between them as they revolve in opposite directions, and deliver the doubled lap or bat to any suitable rolls or feed for further working or for removal.

The distance between the junction 4 of either trunk or spout and the surface of the screen-cylinders is not very particular, provided the velocity of the beater and the blast and the draft of air are proportionate to the distance, so as to blow or carry the cotton forcibly against the screens, and so as to insure the even and uniform lodgment of cotton upon the screen-surfaces.

In order to thoroughly mix several grades or kinds of cotton, and to obtain a favorable and desired result of straightening the staple, the system of doubling from three to six laps on one apron and running them slowly between feed-rolls to a rapidly-rotating beater has been found to be a very successful mode of operating. The greater the number of laps doubled together, the more successful the operation, and the more favorable the result.

In the use of the ordinary cotton-lapper, not more than six laps can be doubled and their mixed contents thrown directly against the screen-cylinders, and in the cotton-lapper which has an upper and a lower beater, both operating under one bonnet, and no upper rack and no separate delivery-spout, the cotton is injured rather than benefited, as the dirt and seeds from the upper beater are thrown onto the lower one and mixed with its cleaned cotton, and thrown off with it to the screen-cylinders, and the cotton which was opened by the upper beater is thrown onto the lower one and rolled or knocked into bunches, rather than opened, since there are no feed-rolls between the two beaters to hold the cotton for the second operation—viz., by the lower beater.

By the use of my improvements I am enabled to double as many as twelve laps and deposit the whole of their mixed contents directly against the screen-cylinders, besides liberating the seeds and dirt and cleaning the cotton in a very superior manner.

In addition to the economy in room or floor-space, I simplify the machinery and reduce the number of parts by making one draft-fan and one pair of cylinder-screens exhaust the air and remove the dust and the finer particles of refuse matter from the cotton passing through two separate trunks, and I also reduce the number of beaters to two, instead of five, as in the English Patent No. 1,766 of 1856, the opened cotton from all of such five beaters being blown through a single but very large trunk or chamber. Besides, I increase the doubling and mixing and cleaning capacity of the machine in a remarkable degree, and render it capable of doubling and mixing cotton in different colors or grades.

A still further advantage is gained in mixing or in doubling the laps of cotton or wool on my improved machine—viz., by doubling, say, six laps of black or blue colored cotton or wool on the lower apron, and six or less laps of white cotton on the upper apron, and by working and blowing both the white and the colored cotton against the screen-cylinders, and either in a mixed condition, or the white cotton laid onto the colored and passed between the screens, and further worked or fully finished in the same relative position.

Such a doubled lap of cotton or wool will produce a very peculiar mix in the fabric made from the yarn, and such a mix can be varied by varying the number of laps of either color used and doubled, or by running one of the feed-aprons faster than the other, or by running one of the beaters at a higher velocity.

If two or more grades or colors of cotton or wool are to be merely well or suitably mixed, no change need be made in the arrangement of the parts of the machine; but if one or more laps of cotton of one color are doubled and worked upon any number of another color, there should be a removable transverse partition or plate, J, extending from the lower side of the upper trunk, H, to near the surface of either screen-cylinder, so as to guide and lap the cotton of one color directly onto the other without mixing.

No other machine of which I have any knowledge is capable of performing the last above-described process, or of opening and cleaning cotton successfully by two beaters or operating-cylinders, arranged one above the other, since no other machine has for each beater a separate rack, seed-chamber, and delivery-spout for disposing of the seeds, sand, and dirt, or of separating the cotton from the refuse matter and delivering it to the screens in a cleaned state, or of mixing cotton of different colors in the manner described.

It will therefore be readily seen that the results or effects produced by the use of my said improvements will be beneficial and important, not only in doubling and mixing twice the number of laps, and thereby producing much better work, but in doubling and mixing cotton or wool of different colors or grades, and in various ways and proportions, and, as the most important, in cleaning the cotton in a manner far superior, in my opinion, to any machine heretofore in use.

A door or trap, L, provides for the removal of seeds and dirt from the upper seed-chamber, G, and a similar door or doors, M, in the lower seed-chamber are for the same purpose.

I claim—

1. The upper trunk, H, as described, when arranged to convey the cotton from the upper beater through the side of the lower trunk, K, and to the cylinder-screens, as set forth, for the purpose of mixing or doubling laps of cotton of different colors or grades, substantially in the manner specified.

2. The plate J, in combination with the trunks H and K, and with the cylinder-screens, in the manner and for the purpose set forth.

3. The combination, substantially as described, of two cotton-pickers, opening and cleaning machines, arranged one above another, and each consisting of a separate and independent feed-apron, a feed roll or rolls, a beater, a rack, and a seed-chamber, and each provided with a separate and independent spout or trunk, H and K, and both with a plate, J, arranged to direct the cotton onto one pair of cylinder-screens, whereby cotton may be opened, cleaned, and formed into a lap or bat, or doubled and mixed, or lapped together in different colors or grades, in the manner and for the purposes substantially as specified.

4. The two cotton opening and cleaning machines, having beaters and separate trunks or spouts H and K, arranged as specified, in combination with, and presenting the material, as described, to a single pair of screen-cylinders, substantially as set forth.

RICHARD KITSON.

Witnesses:
JOHN E. CRANE,
A. A. HART.